United States Patent
Myung et al.

(10) Patent No.: US 11,043,702 B2
(45) Date of Patent: Jun. 22, 2021

(54) ZINC ION SECONDARY BATTERY INCLUDING AQUEOUS ELECTROLYTE

(71) Applicant: INDUSTRY-ACADEMIA COOPERATION GROUP OF SEJONG UNIVERSITY, Seoul (KR)

(72) Inventors: Seung Taek Myung, Seoul (KR); Jae Hyeon Jo, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 288 days.

(21) Appl. No.: 16/222,480

(22) Filed: Dec. 17, 2018

(65) Prior Publication Data
US 2020/0099105 A1 Mar. 26, 2020

(30) Foreign Application Priority Data

Sep. 20, 2018 (KR) .......... 10-2018-0112762
Dec. 17, 2018 (KR) .......... 10-2018-0163484

(51) Int. Cl.
*H01M 10/38* (2006.01)
*H01M 4/38* (2006.01)

(52) U.S. Cl.
CPC .......... *H01M 10/38* (2013.01); *H01M 4/38* (2013.01); *H01M 2300/0002* (2013.01)

(58) Field of Classification Search
None
See application file for complete search history.

(56) References Cited

U.S. PATENT DOCUMENTS

| 4,377,625 A * | 3/1983 | Parsen | H01M 4/06 429/347 |
| 2012/0302783 A1* | 11/2012 | Baumann | C07C 227/02 560/171 |

FOREIGN PATENT DOCUMENTS

JP 62190664 A * 12/1987 .......... H01M 10/36

OTHER PUBLICATIONS

Wilcox et al., Electrolyte Additives for Zinc-Anoded Secondary Cells, Brighteners, Levellers and Complexants, Journal of Power Sources, Elsevier SA, CH, vol. 28, No. 4, pp. 345-359 (Dec. 15, 1989) (Year: 1989).*

* cited by examiner

*Primary Examiner* — Tracy M Dove
(74) *Attorney, Agent, or Firm* — Sughrue Mion, PLLC

(57) ABSTRACT

Disclosed is a zinc ion secondary battery including an aqueous electrolyte. More particularly, the zinc ion secondary battery includes a positive electrode comprising a positive electrode active material; a negative electrode comprising a negative electrode active material; and an aqueous electrolyte disposed between the positive electrode and the negative electrode and containing an aqueous solvent and a metal salt, wherein the metal salt has a composition represented by Formula 1 below:

$A\text{-}x\text{Zn}.y\text{M}$ [Formula 1]

wherein A is an aminopolycarboxylate, x is 1 to 2, y is 0 to 3, and M is an alkali metal.

10 Claims, 5 Drawing Sheets

ZINC ION SECONDARY BATTERY INCLUDING AQUEOUS ELECTROLYTE

CROSS REFERENCE TO RELATED APPLICATIONS

This application claims priority to Korean Patent Application No. 2018-0112762 filed on Sep. 20, 2018, and No. 2018-0163484 filed on Dec. 17, 2018 in the Korean Intellectual Property Office (KIPO), the entire contents of which are hereby incorporated by reference.

BACKGROUND

1. Technical Field

Example embodiments of the present disclosure relate to a zinc ion secondary battery and more specifically to a zinc ion secondary battery including an aqueous electrolyte.

2. Related Art

Secondary batteries refer to batteries capable of being charged/discharged and thus repeatedly used. A lithium secondary battery, as a representative example of secondary batteries, operates by a principle wherein lithium ions included in a positive electrode active material migrate to a negative electrode via an electrolyte and then are intercalated into a layered structure of the negative electrode active material (charging), and then the lithium ions intercalated into the layered structure of the negative electrode active material return to the positive electrode (discharging). Such a lithium secondary battery is currently available and is being used as a small power source of mobile phones, notebooks, and the like. In addition, the lithium secondary battery is expected to be available as a large power source for hybrid cars. Accordingly, demand therefor is expected to increase.

However, since a composite metal oxide mainly used as a positive electrode active material in a lithium secondary battery includes a rare metal element such as lithium, there is a concern that the increased demand might not be met.

Accordingly, research on a sodium secondary battery using sodium, which can be sufficiently supplied and is cheap, as a positive electrode active material was conducted. For example, Korean Patent Application Publication No. 2012-0133300 discloses $A_xMnPO_4F$ (A=Li or Na, 0<x≤2) as a positive electrode active material. However, a sodium battery system still has complex stability and environmental problems.

Meanwhile, as various technologies for flexible electronic devices and recently developed wearable electronic devices, have been developed, demand for a secondary battery operated with a material that does not have a risk of explosion and is stable is increasing. With regard to this, a zinc secondary battery has high stability, compared to other secondary batteries, is ecofriendly and non-toxic, and has high economic efficiency, compared to other alkali metal batteries. Accordingly, research on a zinc secondary battery using zinc as a positive electrode active material is actively underway.

To commercialize such a zinc secondary battery, an aqueous electrolyte using $ZnSO_4$, $Zn(NO_3)_2$, or $Zn(CF_3SO_3)_2$ as well as an organic electrolyte or a solid electrolyte is being used.

However, a zinc ion secondary battery employing such an aqueous electrolyte may undergo a side reaction due to an electrochemical reaction.

As an example of side reactions occurring in the zinc secondary battery, water included in an aqueous solvent may undergo electrolysis, under a potential difference of a certain level or more, due to generation of a potential difference according to driving of the secondary battery. Here, hydrogen gas, zinc hydroxide, or zinc oxide may be generated due to electrolysis of water. Reactions generating hydrogen gas, zinc hydroxide, and zinc oxide are respectively shown in Reaction Schemes 1, 2, and 3 below;

[Reaction Scheme 1]

$$2H_2O \rightarrow 2OH^- + H_2\uparrow \quad (1)$$

$$2OH^- \rightarrow H_2\uparrow + 2O^{2-} \quad (2)$$

$$Zn^{2+} + 2OH^- \rightarrow Zn(OH)_2 \quad \text{[Reaction Scheme 2]}$$

$$2Zn^{2+} + 2O^{2-} \rightarrow 2ZnO_2 \quad \text{[Reaction Scheme 3]}$$

As such, a side reaction occurring due to use of an aqueous electrolyte may make the implementation of a secondary battery difficult and may decrease the lifespan thereof.

SUMMARY

Accordingly, example embodiments of the present disclosure are provided to substantially obviate one or more problems due to limitations and disadvantages of the related art.

Example embodiments of the present disclosure provide a novel aqueous electrolyte for zinc ion secondary batteries.

In accordance with an aspect of the present disclosure, the above and other objects can be accomplished by the provision of a zinc ion secondary battery. In some example embodiments, a zinc ion secondary battery includes a positive electrode including a positive electrode active material capable of intercalating and deintercalating zinc ions; a negative electrode comprising a negative electrode active material; and an aqueous electrolyte disposed between the positive electrode and the negative electrode and containing an aqueous solvent and a metal salt, wherein the metal salt has a composition represented by Formula 1 below:

$$A\text{-}xZn.yM \quad \text{[Formula 1]}$$

wherein A is an aminopolycarboxylate, x is 1 to 2, y is 0 to 3, and M is an alkali metal.

The aqueous solvent may be water.

The aminopolycarboxylate may be ethylene diamine tetra acetate (EDTA), diethylene triamine penta acetate (DTPA), ethylene glycol-bis(β-aminoethyl ether)-N,N,N',N'-tetra acetate (EGTA), 2,2'-azanediyldiacetate (IDA), 2,2',2''-nitrilotriacetate (NTA), 1,2-bis(o-aminophenoxy)ethane-N,N,N',N'-tetra acetate (BAPTA), 1,4,7,10-tetraazacyclododecane-1,4,7,10-tetra acetate (DOTA), NOTA, fura-2, nicotianamine, or 2-[2-[[2-hydroxy-1-(2-hydroxyphenyl)-2-oxoethyl]amino]ethylamino]-2-(2-hydroxyphenyl)acetate (EDDHA).

In Formula 1, M may be Li, Na, K, Rb, or Cs.

The metal salt may be EDTA-Zn.2Na.

A molar concentration of the aqueous electrolyte may be 0.1 M to 2 M.

In accordance with another aspect of the present disclosure, there is provided a method of manufacturing a zinc ion secondary battery. In other example embodiments, a method of preparing a zinc ion secondary battery includes preparing an aqueous electrolyte containing an aqueous solvent and a metal salt; sequentially laminating a positive electrode, a separator, and a negative electrode to form an electrode group; and impregnating the electrode group with the aqueous electrolyte, wherein the metal salt has a composition represented by Formula 1 below:

$$A\text{-}xZn.yM \quad \text{[Formula 1]}$$

wherein A is an aminopolycarboxylate, x is 1 to 2, y is 0 to 3, and M is an alkali metal.

The aqueous solvent may be water.

The aminopolycarboxylate may be ethylene diamine tetra acetate (EDTA), diethylene triamine penta acetate (DTPA), ethylene glycol-bis(β-aminoethyl ether)-N,N,N',N'-tetra acetate (EGTA), 2,2'-azanediyldiacetate (IDA), 2,2',2''-nitrilotriacetate (NTA), 1,2-bis(o-aminophenoxy)ethane-N,N,N',N'-tetra acetate (BAPTA), 1,4,7,10-tetraazacyclododecane-1,4,7,10-tetra acetate (DOTA), NOTA, fura-2, nicotianamine, or 2-[2-[[2-hydroxy-1-(2-hydroxyphenyl)-2-oxoethyl]amino]ethylamino]-2-(2-hydroxyphenyl)acetate (EDDHA).

In Formula 1, M may be Li, Na, K, Rb, or Cs.

The metal salt may be EDTA-Zn.2Na.

A molar concentration of the aqueous electrolyte may be 0.1 M to 2 M.

BRIEF DESCRIPTION OF DRAWINGS

Example embodiments of the present disclosure will become more apparent by describing in detail example embodiments of the present disclosure with reference to the accompanying drawings, in which.

DESCRIPTION OF EXAMPLE EMBODIMENTS

Hereinafter, the present disclosure will be described in detail by describing exemplary embodiments of the disclosure with reference to the attached drawings. However, the scope of the present disclosure is not limited to the embodiments described in the present specification and may be embodied in other forms.

Figure 1:
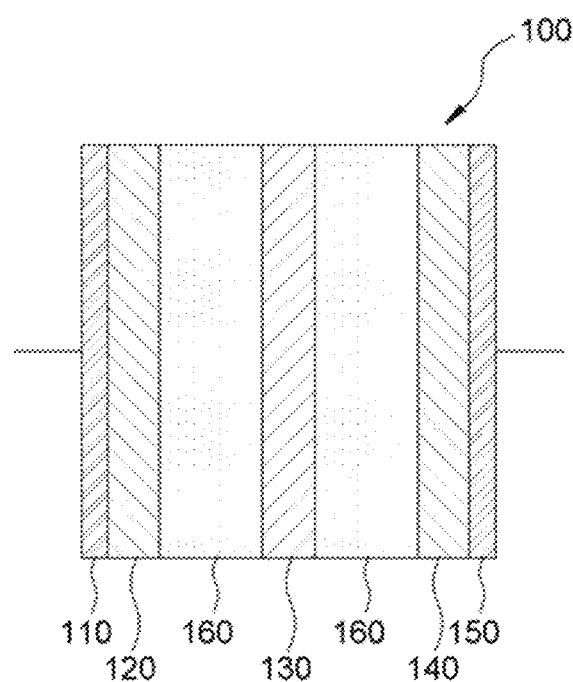
FIG. 1 is a schematic view illustrating a secondary battery according to an embodiment of the present disclosure.

FIG. 1 is a schematic view illustrating a secondary battery according to an embodiment of the present disclosure.

Referring to FIG. 1, a secondary battery 100 includes a negative electrode active material layer 120 containing a negative electrode active material, a positive electrode active material layer 140 containing a positive electrode active material, and a separator 130 disposed between the negative electrode active material layer 120 and the positive electrode active material layer 140. An electrolyte 160 may be disposed or filled between the negative electrode active material layer 120 and the separator 130 and between the positive electrode active material layer 140 and the separator 130. The negative electrode active material layer 120 may be disposed on a negative electrode current collector 110, and the positive electrode active material layer 140 may be disposed on a positive electrode current collector 150.

<Electrolyte>

In accordance with an embodiment of the present disclosure, an aqueous electrolyte for zinc ion secondary batteries may contain an aqueous solvent and a metal salt.

A secondary battery including the aqueous electrolyte may have high ion conductivity. In addition, the secondary battery may be advantageous from the standpoint of stability, and process and manufacturing costs thereof may be low.

In addition, a secondary battery including an aqueous solvent prepared by adding a metal salt to water and stirring the same may have excellent stability.

The metal salt may have a composition represent by Formula 1 below:

$$A\text{-}xZn.yM \quad \text{[Formula 1]}$$

In Formula 1, A may be an aminopolycarboxylate. The aminopolycarboxylate may have a structure wherein one or more nitrogen atoms are connected to two or more carboxyl groups through carbon atoms in one molecule.

As an aminopolycarboxylate has two or more carboxyl groups, it may serve as a chelate. Preferably, the aminopolycarboxylate may include two to five carboxyl groups. Accordingly, since an aminopolycarboxylate-zinc (A-xZn) salt is ionized by being dissolved in an aqueous solvent, and carboxyl groups that are not paired with Zn may be present as anions, the aminopolycarboxylate may have a negative oxidation number. Here, unpaired carboxyl groups may bind with $H^+$ ions generated by an electrochemical reaction in a zinc ion secondary battery. As a result, generation of hydrogen gas due to a side reaction occurring in the zinc ion secondary battery may be prevented.

Examples of an aminopolycarboxylate include ethylene diamine tetra acetate (EDTA), diethylene triamine penta acetate (DTPA), ethylene glycol-bis(β-aminoethyl ether)-N,N,N',N'-tetra acetate (EGTA), 2,2'-azanediyldiacetate (IDA), 2,2',2''-nitrilotriacetate (NTA), 1,2-bis(o-aminophenoxy)ethane-N,N,N',N'-tetra acetate (BAPTA), 1,4,7,10-tetraazacyclododecane-1,4,7,10-tetra acetate (DOTA), NOTA, fura-2, nicotianamine, 2-[2-[[2-hydroxy-1-(2-hydroxyphenyl)-2-oxoethyl]amino]ethylamino]-2-(2-hydroxyphenyl) acetate (EDDHA), and the like, but the present disclosure is not limited thereto.

In Table 1 below, amino carboxylates and conjugate acids thereof are summarized.

TABLE 1

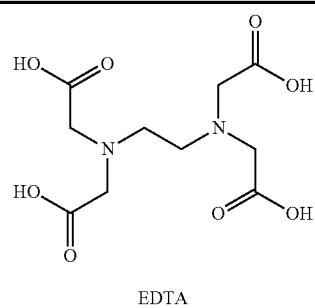

EDTA

TABLE 1-continued

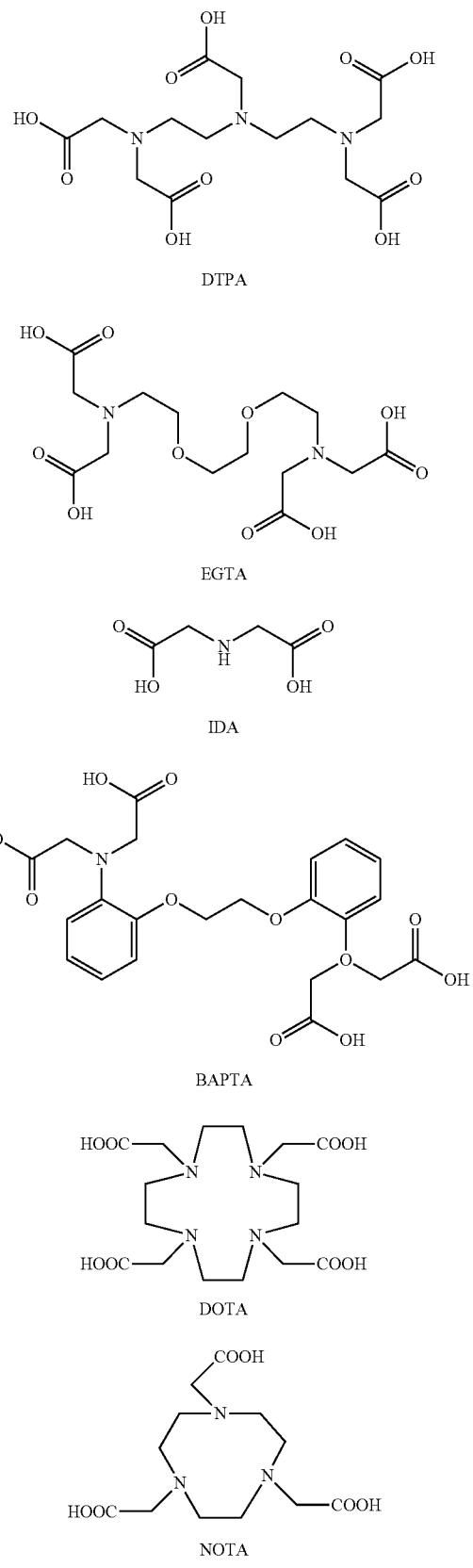

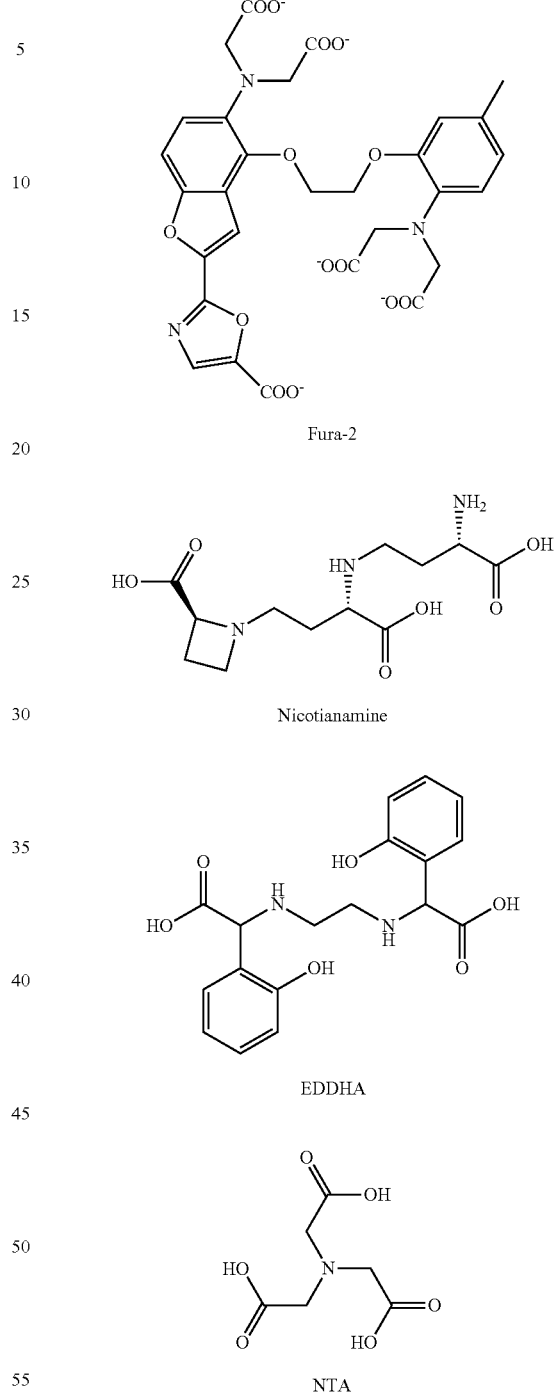

x may be 1 to 2. y may be 0 to 3. x and y indicate relative composition ratios of respective components and each independently may be in ranges satisfying the respective values.

In Formula 1, M may be a metal. In particular, M may be an alkali metal. For example, M may be selected from the group consisting of Li, Na, K, Rb, and Cs.

More particularly, the metal salt may be EDTA-Zn.2Na. EDTA-Zn.2Na may be represented by Formula 2 below:

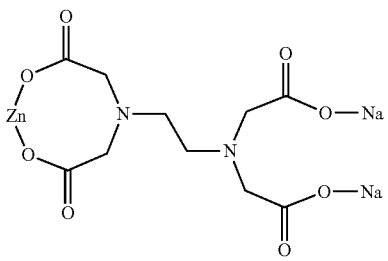

[Formula 2]

When a metal salt is EDTA-Zn.2Na as in Formula 2, since EDTA has four carboxyl groups, two carboxyl groups thereof may form a chelate with a Zn ion, and two unpaired carboxyl groups may present as anions. Accordingly, the unpaired carboxyl groups may react with hydrogen ions. As a result, generation of hydrogen gas may be prevented.

That is, the metal salt according to an embodiment of the present disclosure may serve as a chelating agent while supplying a metal. Accordingly, a zinc ion secondary battery prepared using an aqueous electrolyte containing the metal salt of Formula 1 and an aqueous solvent according to an embodiment of the present disclosure may have excellent long-term lifespan characteristics and exhibit excellent stability.

<Positive Electrode>

A positive electrode material may be obtained by mixing a positive electrode active material, a conductive material, and a binder.

The conductive material may be a carbon material such as natural graphite, artificial graphite, coke, carbon black, carbon nanotubes, or graphene. The binder may include a thermoplastic resin, for example, a fluorine resin such as polyvinylidene fluoride, polytetrafluoroethylene, tetrafluoroethylene, a vinylidene fluoride-based copolymer or propylene hexafluoride, and/or a polyolefin resin such as polyethylene or polypropylene.

A positive electrode may be formed by coating a positive electrode current collector with a positive electrode material. The positive electrode current collector may be a conductive material such as Al, Ni, or stainless steel. The positive electrode current collector may be coated with the positive electrode material by press molding or using an organic solvent and the like, and a method of coating the positive electrode current collector with a prepared paste and pressing and fixing the same may be used. The organic solvent may be an amine such as N,N-dimethylaminopropylamine or diethyltriamine; an ether such as an ethylene oxide or tetrahydrofuran; a ketone such as methyl ethyl ketone; an ester such as methyl acetate; an aprotic polar solvent such as dimethylacetamide or N-methyl-2-pyrrolidone; or the like. The positive electrode current collector may be coated with the paste, for example, by a gravure coating method, a slit-die coating method, a knife coating method, or a spray coating method.

<Negative Electrode>

A negative electrode active material may be formed using a metal, a metal alloy, a metal oxide, a metal fluoride, a metal sulfide, a carbon material such as natural graphite, artificial graphite, coke, carbon black, carbon nanotubes, or graphene, or the like causing a deintercalation/intercalation or conversion reaction of metal ions.

A negative electrode material may be obtained by mixing a negative electrode active material, a conductive material, and a binder.

The conductive material may be a carbon material such as natural graphite, artificial graphite, coke, carbon black, carbon nanotubes, or graphene. The binder may include a thermoplastic resin, for example, a fluorine resin such as polyvinylidene fluoride, polytetrafluoroethylene, tetrafluoroethylene, a vinylidene fluoride-based copolymer, or propylene hexafluoride, and/or a polyolefin resin such as polyethylene or polypropylene.

A negative electrode may be formed by coating a positive electrode current collector with a negative electrode material. The positive electrode current collector may be a conductive material such as Al, Ni, or stainless steel. The negative electrode current collector may be coated with the negative electrode material by press molding or using an organic solvent and the like, and a method of coating the current collector with a prepared paste and pressing and fixing the same may be used. The organic solvent may be an amine such as N,N-dimethylaminopropylamine or diethyltriamine; an ether such as an ethylene oxide or tetrahydrofuran; a ketone such as methyl ethyl ketone; an ester such as methyl acetate; an aprotic polar solvent such as dimethylacetamide or N-methyl-2-pyrrolidone; or the like. The negative electrode current collector may be coated with the paste, for example, by a gravure coating method, a slit-die coating method, a knife coating method, or a spray coating method.

<Separator>

A separator may be disposed between a positive electrode and a negative electrode. Such a separator may be a porous film, a nonwoven fabric, a woven fabric, or the like made of a material such as a polyolefin resin such as polyethylene or polypropylene, a fluorine resin, or a nitrogen-containing aromatic polymer. The separator preferably has a thin thickness so long as the mechanical strength thereof is maintained because the volume energy density of a battery increases and the internal resistance thereof is decreased with an increasing thickness of the separator. The thickness of the separator may be generally about 5 to 200 μm, more particularly 5 to 40 μm.

<Method of Manufacturing Zinc Ion Secondary Battery>

The aqueous electrolyte according to an embodiment of the present disclosure is prepared. Next, the positive electrode, the separator, and the negative electrode are sequentially laminated in this order to form an electrode group, and then, as needed, the electrode group is rolled up and stored in a battery can. The battery electrode group is impregnated with an aqueous electrolyte, thereby manufacturing a zinc ion secondary battery.

Hereinafter, the present disclosure will be described in more detail with reference to the following Examples. However, it should be understand that the examples are merely for concretely explaining the spirit of the disclosure and therefore, there is no intent to limit the disclosure to the Examples.

EXAMPLES

Manufacturing Example 1: Manufacture of Zinc Ion Half-Cell Provided with Organic Electrolyte Including 1 M EDTA-Zn.2Na A $KV_3O_8$ powder, a conductive material (carbon black), and a binder (polyvinylidene fluoride, PVDF) in a weight ratio of 8:1:1 were mixed with an organic solvent (N-methyl-2-pyrrolidone, NMP), thereby forming a slurry. Next, a stainless steel mesh current collector was coated with the slurry, and then dried at 80° C. overnight under vacuum, thereby forming a positive electrode.

Using the positive electrode, a zinc metal plate as a negative electrode, a glass filter as a separator, and 1 M EDTA-Zn.2Na as an aqueous electrolyte, a 2032-type coin cell, as a zinc ion half-cell, was manufactured.

Comparative Example 1-1: Manufacture of Zinc Ion Half-Cell Provided with Organic Electrolyte Including $ZnSO_4$ A coin cell, as a zinc ion half-cell, was manufactured in the same manner as in Manufacturing Example 1, except that an aqueous 1 M $ZnSO_4$ electrolyte was used instead of an aqueous 1 M EDTA-Zn.2Na electrolyte.

Comparative Example 1-2: Manufacture of Zinc Ion Half-Cell Provided with Organic Electrolyte Including $Zn(CF_3SO_3)_2$ A coin cell, as a zinc ion half-cell, was manufactured in the same manner as in Manufacturing Example 1, except that an aqueous 1 M $Zn(CF_3SO_3)_2$ electrolyte was used instead of an aqueous 1 M EDTA-Zn.2Na electrolyte.

Figure 2A:
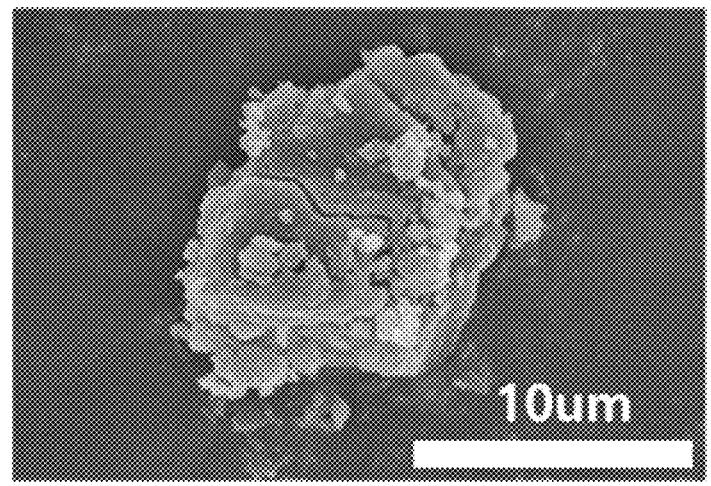
FIG. 2A is a scanning electron microscope (SEM) photograph illustrating a particle shape of an aqueous electrolyte used in Manufacturing Example 1 of the present disclosure.
Figure 2B:
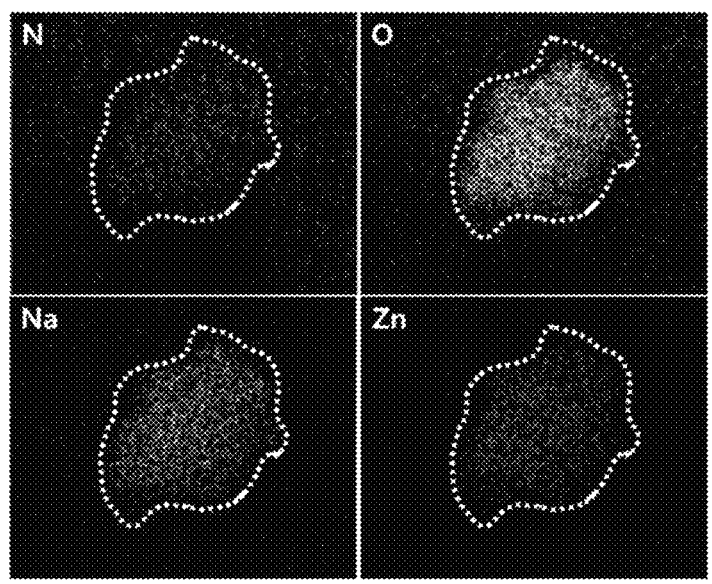
FIG. 2B illustrates EDX analysis results of a particle shape and an element distribution of an aqueous electrolyte according to Manufacturing Example 1 of the present disclosure.

FIG. 2A is a SEM photograph illustrating a particle shape of an aqueous electrolyte used in Manufacturing Example 1 of the present disclosure; and FIG. 2B illustrates EDX analysis results of a particle shape and an element distribution of an aqueous electrolyte according to Manufacturing Example 1 of the present disclosure.

From the SEM photograph and the EDX analysis results of FIG. 2, it can be confirmed that the EDTA-Zn.2Na salt prepared according to Manufacturing Example 1 is composed of O, N, and Zn elements. In addition, it can be confirmed that each of the O, N and Zn elements is uniformly distributed in particles of the salt according to Manufacturing Example 1.

Manufacturing Example 2: Manufacture of Zinc Ion Half-Cell Provided with Organic Electrolyte Including 0.1 M EDTA-Zn 2Na A coin cell, as a zinc ion half-cell, was manufactured in the same manner as in Manufacturing Example 1, except that an aqueous 0.1 M EDTA-Zn.2Na electrolyte was used instead of an aqueous 1 M EDTA-Zn.2Na electrolyte.

Manufacturing Example 3: Manufacture of Zinc Ion Half-Cell Provided with Organic Electrolyte Including 0.5 M EDTA-Zn.2Na A coin cell, as a zinc ion half-cell, was manufactured in the same manner as in Manufacturing Example 1, except that an aqueous 0.5 M EDTA-Zn.2Na electrolyte was used instead of an aqueous 1 M EDTA-Zn.2Na electrolyte.

Manufacturing Example 4: Manufacture of Zinc Ion Half-Cell Provided with Organic Electrolyte Including 3M EDTA-Zn.2Na A coin cell, as a zinc ion half-cell, was manufactured in the same manner as in Manufacturing Example 1, except that an aqueous 3 M EDTA-Zn.2Na electrolyte was used instead of an aqueous 1 M EDTA-Zn.2Na electrolyte.

Evaluation Example 1: Evaluation of Characteristics of Zinc Ion Half-Cell

Figure 3A:
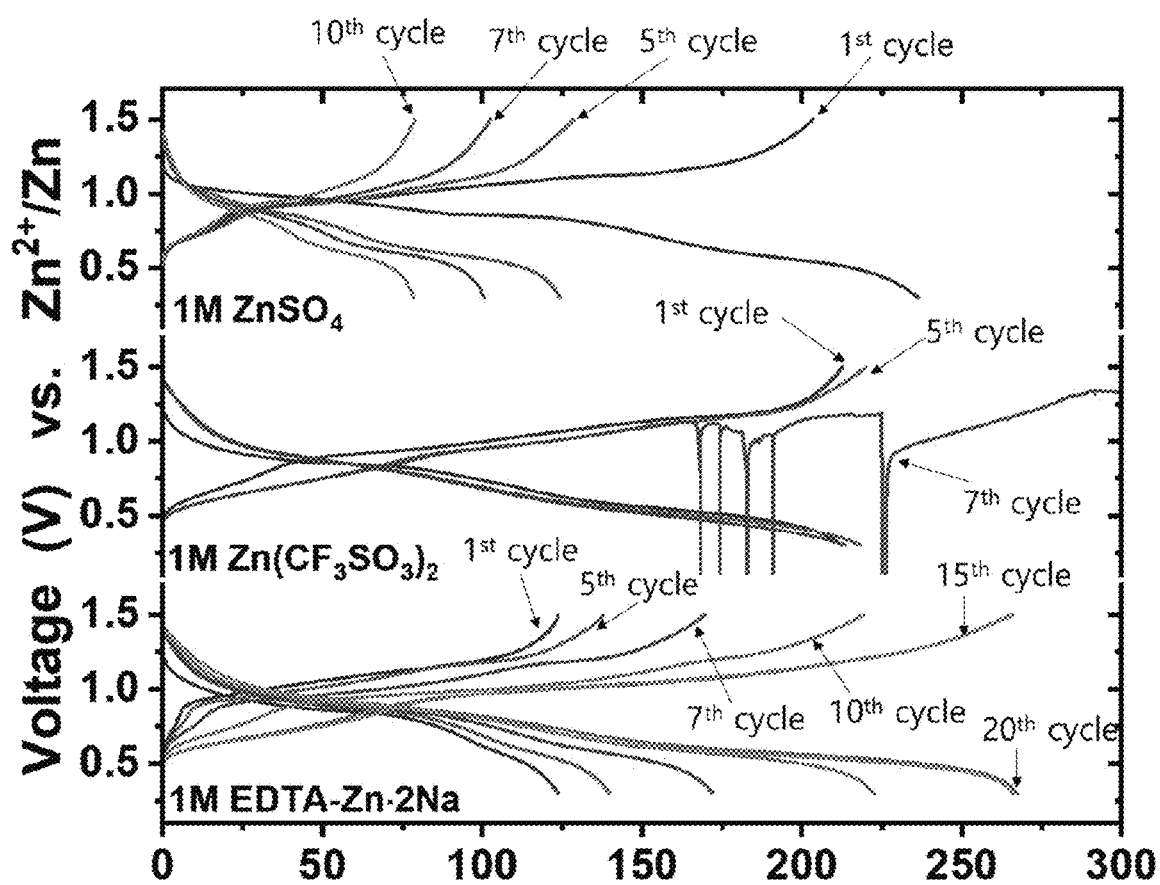
FIGS. 3A and 3B are graphs respectively illustrating charge/discharge characteristics of zinc ion half-cells obtained according to Manufacturing Example 1 and Comparative Examples 1-1 and 1-2 and discharge capacities according to cycle number.
Figure 3B:
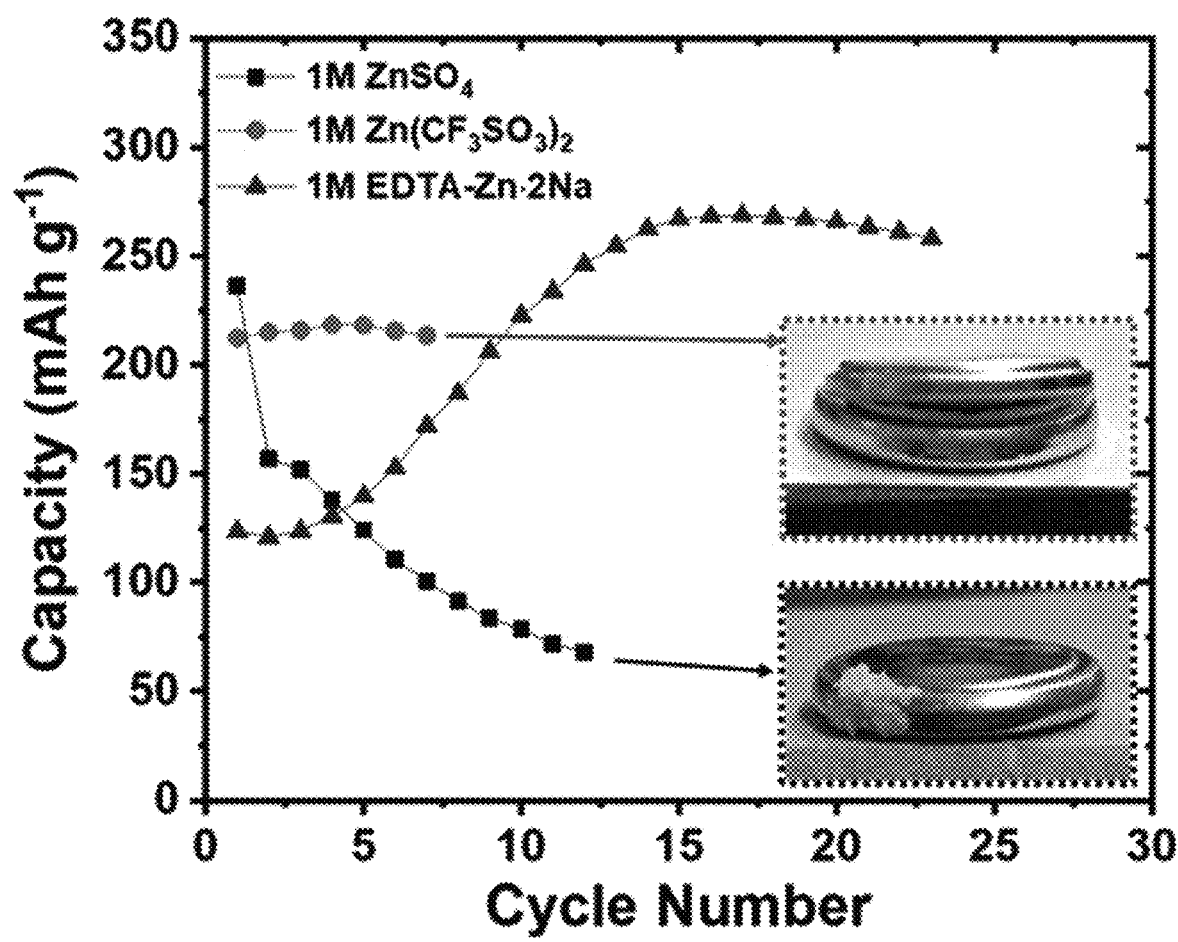

FIGS. 3A and 3B are graphs respectively illustrating charge/discharge capacities of zinc ion half-cells obtained according to Manufacturing Example 1 and Comparative Examples 1-1 and 1-2 and discharge capacities according to cycle number.

Referring to FIG. 3A, it can be confirmed that the capacities of the zinc ion half-cells manufactured according to Comparative Examples 1-1 and 1-2 are reduced with an increasing cycle number. However, it can be confirmed that the capacity of the zinc ion half-cell manufactured according to Manufacturing Example 1 increases with an increasing cycle number.

Referring to FIG. 3B, it can be confirmed that, in both the zinc ion half-cells provided with the organic electrolytes respectively including $ZnSO_4$ and $Zn(CF_3SO_3)_2$ prepared according to Comparative Examples 1-1 and 1-2, a short occurs at about the initial 10 cycles. In addition, from the attached photograph, it can be confirmed that a shorted half-cell may explode, or the half-cell may expand due to the generation of a gas according to a side reaction, and thus, the stability thereof is greatly decreased.

On other hand, it can be confirmed that, in the case of Manufacturing Example 1, a short does not occur even after 20 cycles. Accordingly, it can be confirmed that the zinc ion half-cell provided with the organic electrolyte including EDTA-Zn.2Na exhibits excellent long-term lifespan characteristics. The increase in stability of the secondary battery according to Manufacturing Example 1 is considered to occur because EDTA-Zn.2Na functions as a chelating agent due to use of EDTA-Zn.2Na as an aqueous electrolyte, and thus, a side reaction, such as the generation of $H_2$ gas in the zinc ion secondary battery, is inhibited as unpaired carboxylate groups of EDTA bind with $H^+$.

Figure 4:
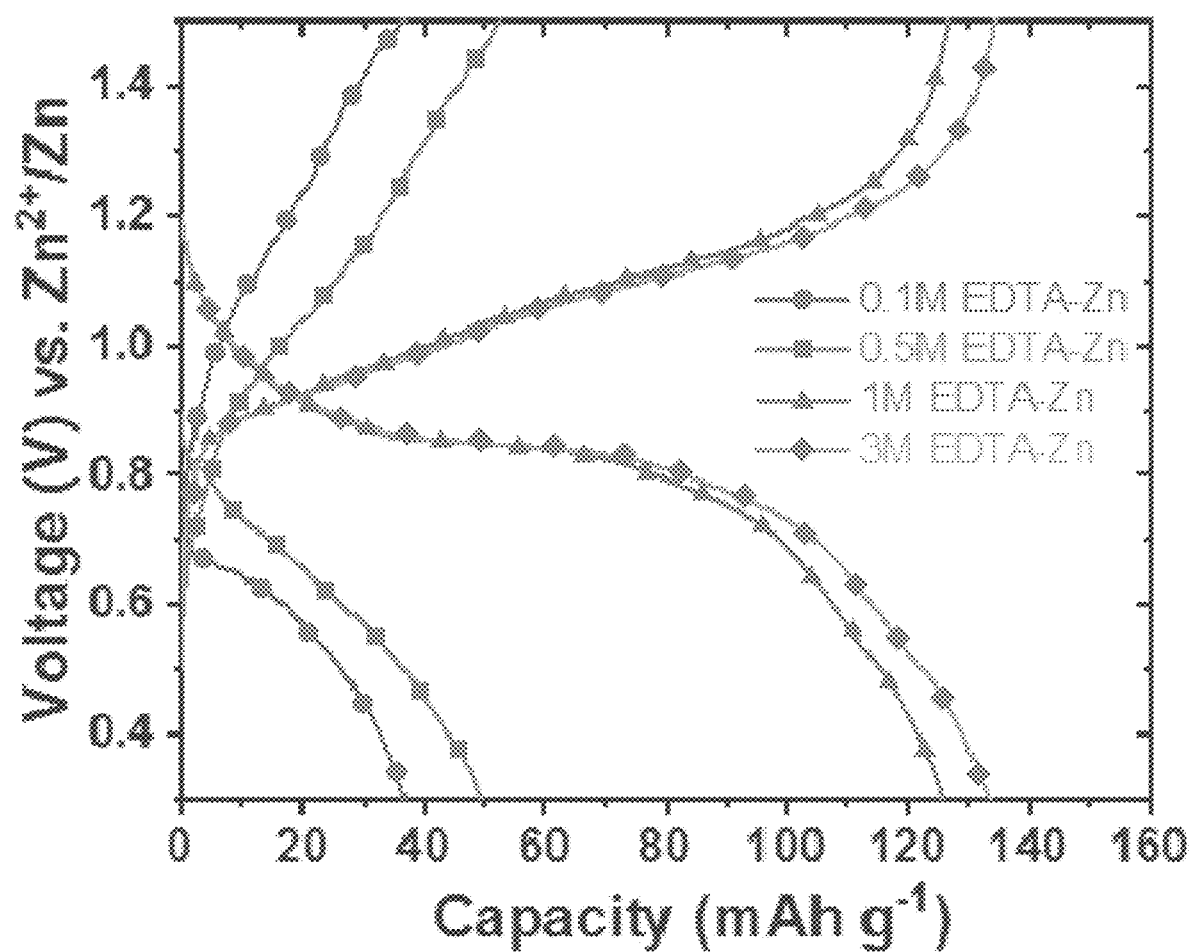
FIG. 4 is a graph illustrating charge/discharge characteristics of zinc ion half-cells obtained according to Manufacturing Examples 1 to 4.

FIG. 4 is a graph illustrating charge/discharge characteristics of zinc ion half-cells obtained according to Manufacturing Examples 1 to 4.

Referring to FIG. 4, it can be firmed that a discharge capacity is changed according to the molar concentration of EDTA-Zn.2Na. When the molar concentrations of the EDTA-Zn-2Na electrolyte are 0.1 M, 0.5 M, 1 M, and 3 M, discharge capacities thereof were respectively confirmed as 36.79 mAh/g, 49.58 mAh/g, 125.88 mAh/g, and 133.47 mAh/g.

That is, an appropriate molar concentration of the EDTA-Zn.2Na electrolyte is 0.5 M to 3 M. Preferably, the molar concentration of the EDTA-Zn.2Na electrolyte is 1 M to 2 M. Within these ranges, a zinc ion secondary battery which is economically efficient and exhibits high ionic conductivity due to ionized zinc ions in an aqueous electrolyte and thus excellent electrochemical characteristics may be provided.

As apparent from the above description, a zinc ion secondary battery including an aqueous electrolyte according to the present disclosure has excellent stability and exhibits high ionic conductivity, compared to a zinc ion secondary battery including an organic electrolyte. In addition, since a side reaction due to use of an aqueous electrolyte is inhibited in the zinc ion secondary battery including the aqueous electrolyte, the zinc ion secondary battery including the aqueous electrolyte exhibits excellent long-term lifespan characteristics.

Although the present disclosure has been described in detail with reference to preferred embodiments, those skilled in the art will appreciate that the scope of the present disclosure is not limited to the embodiments and various modifications and changes are possible within the technical spirit and scope of the present disclosure.

DESCRIPTION OF SYMBOLS

100: Secondary battery
110: Negative electrode current collector

120: Negative electrode active material layer
130: Separator
140: Positive electrode active material layer
150: Positive electrode current collector
160: Electrolyte

What is claimed is:

1. A zinc ion secondary battery, comprising:
a positive electrode comprising a positive electrode active material;
a negative electrode comprising a negative electrode active material; and
an aqueous electrolyte disposed between the positive electrode and the negative electrode and containing an aqueous solvent and a metal salt,
wherein a molar concentration of the metal salt in the aqueous electrolyte is 1 M to 2 M, and
wherein the metal salt has a composition represented by Formula 1 below:

$$A\text{-}x\text{Zn}.y\text{M} \qquad \text{Formula 1}$$

wherein A is an aminopolycarboxylate,
x is 1 to 2,
y is 0 to 3, and
M is an alkali metal.

2. The zinc ion secondary battery according to claim 1, wherein the aqueous solvent is water.

3. The zinc ion secondary battery according to claim 1, wherein the aminopolycarboxylate is ethylene diamine tetra acetate (EDTA), diethylene triamine penta acetate (DTPA), ethylene glycol-bis(β-aminoethyl ether)-N,N,N',N'-tetra acetate (EGTA), 2,2'-azanediyldiacetate (IDA), 2,2',2"-nitrilotriacetate (NTA), 1,2-bis(o-aminophenoxy)ethane-N,N,N',N'-tetra acetate (BAPTA), 1,4,7,10-tetraazacyclododecane-1,4,7,10-tetra acetate (DOTA), 1,4,7-triazacyclononane-1,4,7-triacetic acid (NOTA), fura-2, nicotianamine, or 2-[2-[[2-hydroxy-1-(2-hydroxyphenyl)-2-oxoethyl]amino]ethylamino]-2-(2-hydroxyphenyl)acetate (EDDHA).

4. The zinc ion secondary battery according to claim 1, wherein, in Formula 1, M is Li, Na, K, Rb, or Cs.

5. The zinc ion secondary battery according to claim 1, wherein the metal salt is EDTA-Zn.2Na.

6. A method of preparing a zinc ion secondary battery, the method comprising:
preparing an aqueous electrolyte containing an aqueous solvent and a metal salt;
sequentially laminating a positive electrode, a separator, and a negative electrode to form an electrode group; and
impregnating the electrode group with the aqueous electrolyte,
wherein a molar concentration of the metal salt in the aqueous electrolyte is 1 M to 2 M, and
wherein the metal salt has a composition represented by Formula 1 below:

$$A\text{-}x\text{Zn}.y\text{M} \qquad \text{Formula 1}$$

wherein A is an aminopolycarboxylate,
x is 1 to 2,
y is 0 to 3, and
M is an alkali metal.

7. The method according to claim 6, wherein the aqueous solvent is water.

8. The method according to claim 6, wherein the aminopolycarboxylate is ethylene diamine tetra acetate (EDTA), diethylene triamine penta acetate (DTPA), ethylene glycol-bis(β-aminoethyl ether)-N,N,N',N'-tetra acetate (EGTA), 2,2'-azanediyldiacetate (IDA), 2,2',2"-nitrilotriacetate (NTA), 1,2-bis(o-aminophenoxy)ethane-N,N,N',N'-tetra acetate (BAPTA), 1,4,7,10-tetraazacyclododecane-1,4,7,10-tetra acetate (DOTA), 1,4,7-triazacyclononane-1,4,7-triacetic acid (NOTA), fura-2, nicotianamine, or 2-[2-[[2-hydroxy-1-(2-hydroxyphenyl)-2-oxoethyl]amino]ethylamino]-2-(2-hydroxyphenyl)acetate (EDDHA).

9. The method according to claim 6, wherein, in Formula 1, M is Li, Na, K, Rb, or Cs.

10. The method according to claim 6, wherein the metal salt is EDTA-Zn.2Na.

* * * * *